US012701256B2

(12) United States Patent
Kang et al.

(10) Patent No.: US 12,701,256 B2
(45) Date of Patent: *Aug. 4, 2026

(54) VIDEO ENCODING AND DECODING USING ADAPTIVE COLOR TRANSFORM

(71) Applicants: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(72) Inventors: Je Won Kang, Seoul (KR); Seung Wook Park, Yongin-si (KR); Wha Pyeong Lim, Hwaseong-si (KR)

(73) Assignees: HYUNDAI MOTOR COMPANY, Seoul (KR); KIA CORPORATION, Seoul (KR); EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/912,340

(22) Filed: Oct. 10, 2024

(65) Prior Publication Data

US 2025/0039425 A1 Jan. 30, 2025

Related U.S. Application Data

(63) Continuation of application No. 17/792,460, filed as application No. PCT/KR2021/000527 on Jan. 14, 2021, now Pat. No. 12,149,725.

(30) Foreign Application Priority Data

Jan. 14, 2020 (KR) ........................ 10-2020-0004645
Feb. 24, 2020 (KR) ........................ 10-2020-0022425

Jan. 14, 2021 (KR) ........................ 10-2021-0005127

(51) Int. Cl.
*H04N 19/46* (2014.01)
*H04N 19/176* (2014.01)
(Continued)

(52) U.S. Cl.
CPC ........... *H04N 19/46* (2014.11); *H04N 19/176* (2014.11); *H04N 19/186* (2014.11); *H04N 19/70* (2014.11)

(58) Field of Classification Search
CPC .... H04N 19/46; H04N 19/176; H04N 19/186; H04N 19/70
(Continued)

(56) References Cited

U.S. PATENT DOCUMENTS 9,736,481 B2 8/2017 Zhang et al.
9,948,933 B2 4/2018 Zhang et al.
(Continued)

FOREIGN PATENT DOCUMENTS

KR 20160132866 A 11/2016
KR 20170013274 A 2/2017

OTHER PUBLICATIONS

Bross, Benjamin et al.; "Versatile Video Coding (Draft 7)"; Joint Video Experts Team (JVET) of ITU-T SG 16 WP 3 and ISO/IEC JTC 1/SC 29/WG 11; 16th Meeting: Geneva, CH, Oct. 1-11, 2019 (490 pages).
(Continued)

*Primary Examiner* — Albert Kir
(74) *Attorney, Agent, or Firm* — Lempia Summerfield Katz LLC

(57) ABSTRACT

Disclosed is a method for video encoding and decod-ing using adaptive color transform on a residual signal. In particular, the maximum memory size required for adaptive
(Continued)

color transform is limited by: controlling whether to allow color space conversion on a sequence level according to a syntax element indicating the maximum conversion size allowed for a sequence of pictures; or controlling whether to apply color space conversion on a block level according to the size of a coding block.

9 Claims, 8 Drawing Sheets

(51) Int. Cl.
　　*H04N 19/186*　　(2014.01)
　　*H04N 19/70*　　(2014.01)
(58) Field of Classification Search
　　USPC ..................................................... 375/240.26
　　See application file for complete search history.

(56) References Cited

U.S. PATENT DOCUMENTS

| | | | |
|---|---|---|---|
| 10,142,642 B2 | 11/2018 | Zhang et al. | |
| 10,271,052 B2 | 4/2019 | Zhang et al. | |
| 11,070,810 B2 | 7/2021 | Zhang et al. | |
| 11,146,806 B2 | 10/2021 | Chen | |
| 11,700,377 B2 * | 7/2023 | Koo ..................... | H04N 19/122 |
| | | | 375/240.02 |
| 11,706,430 B2 * | 7/2023 | Kim ..................... | H04N 19/593 |
| | | | 375/240.18 |
| 11,818,356 B2 | 11/2023 | Choi | |
| 11,838,523 B2 | 12/2023 | Zhu | |
| 2015/0264354 A1 | 9/2015 | Zhang et al. | |
| 2015/0264364 A1 | 9/2015 | Zhang et al. | |
| 2015/0264402 A1 | 9/2015 | Zhang et al. | |
| 2015/0264405 A1 | 9/2015 | Zhang et al. | |
| 2015/0358631 A1 | 12/2015 | Zhang et al. | |
| 2021/0289218 A1 * | 9/2021 | Chen ..................... | H04N 19/157 |
| 2021/0329271 A1 * | 10/2021 | Zhao ..................... | H04N 19/17 |

OTHER PUBLICATIONS

Chen, Jianle et al.; "Algorithm description for Versatile Video Coding and Test Model 7 (VTM 7)"; Joint Video Experts Team (JVET) of ITU-T SG 16 WP 3 and ISO/IEC JTC 1/SC 29/WG 11; 16th Meeting: Geneva, CH, Oct. 1-11, 2019 (91 pages).

International Search Report issued in related Application No. PCT/KR2021/000527 (6 pages).

Kondo, Kenji et al.; "A memory issue on adaptive color transform"; Joint Video Experts Team (JVET) of ITU-T SG 16 WP 3 and ISO/IEC JTC 1/SC 29/WG 11; 17th Meeting: Brussels, BE, Jan. 7-17, 2020 (6 pages).

Jianle Chen et al., Algorithm Description of Joint Exploration Test Model 7 (JEM 7), JVET-G1001-v1 JVET of ITU-T SG 16WP 3 and ISO/IEC JTC 1/SC 29/WG 11 7th Meeting: Torino, IT, Jul. 13-21, 2017, 48pp.

Office action cited in Korean application No. 10-2021-0005127; Apr. 29, 2026; 18 pp.

* cited by examiner

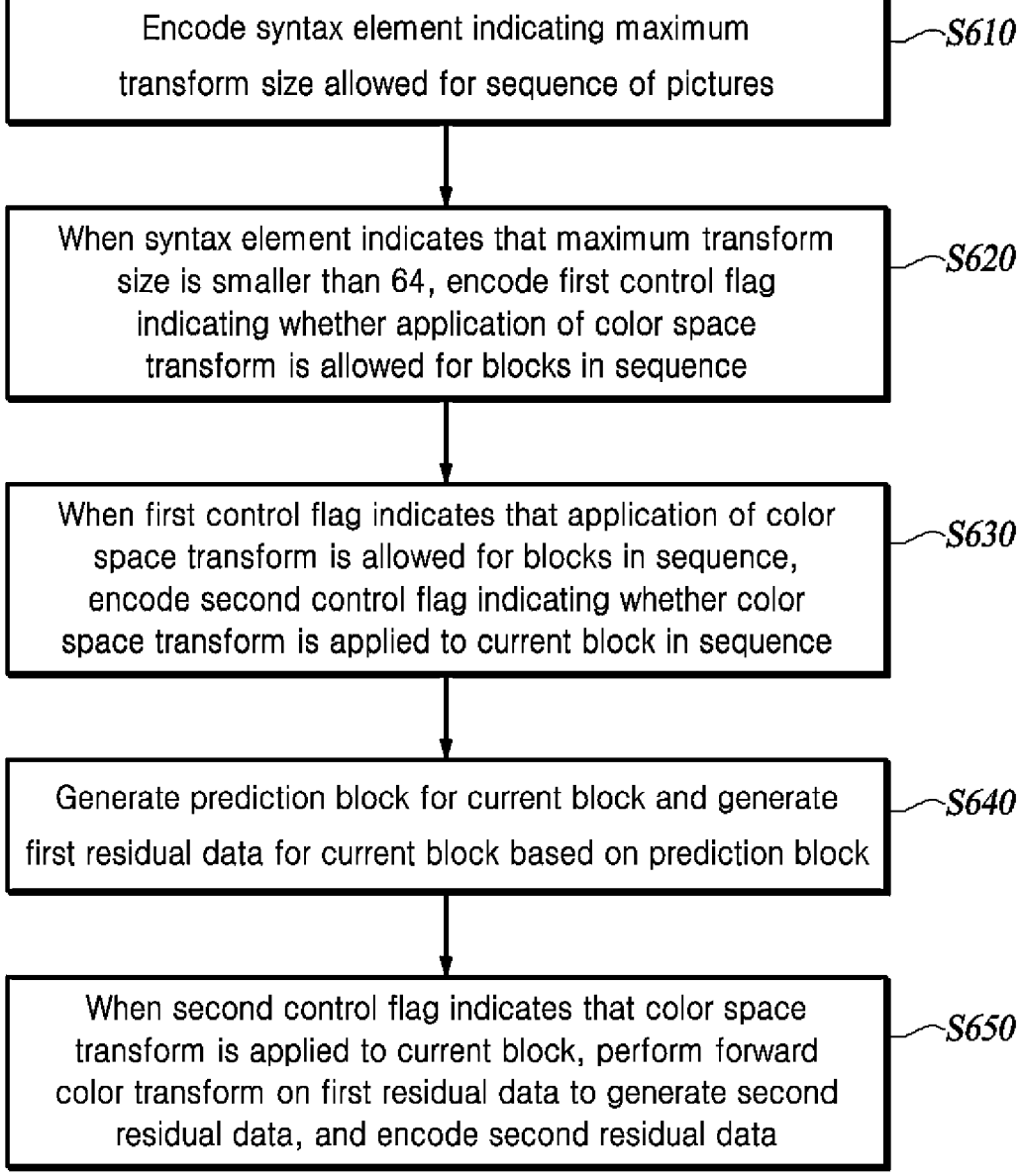

Encode syntax element indicating maximum transform size allowed for sequence of pictures — S610

When syntax element indicates that maximum transform size is smaller than 64, encode first control flag indicating whether application of color space transform is allowed for blocks in sequence — S620

When first control flag indicates that application of color space transform is allowed for blocks in sequence, encode second control flag indicating whether color space transform is applied to current block in sequence — S630

Generate prediction block for current block and generate first residual data for current block based on prediction block — S640

When second control flag indicates that color space transform is applied to current block, perform forward color transform on first residual data to generate second residual data, and encode second residual data — S650

*FIG. 6*

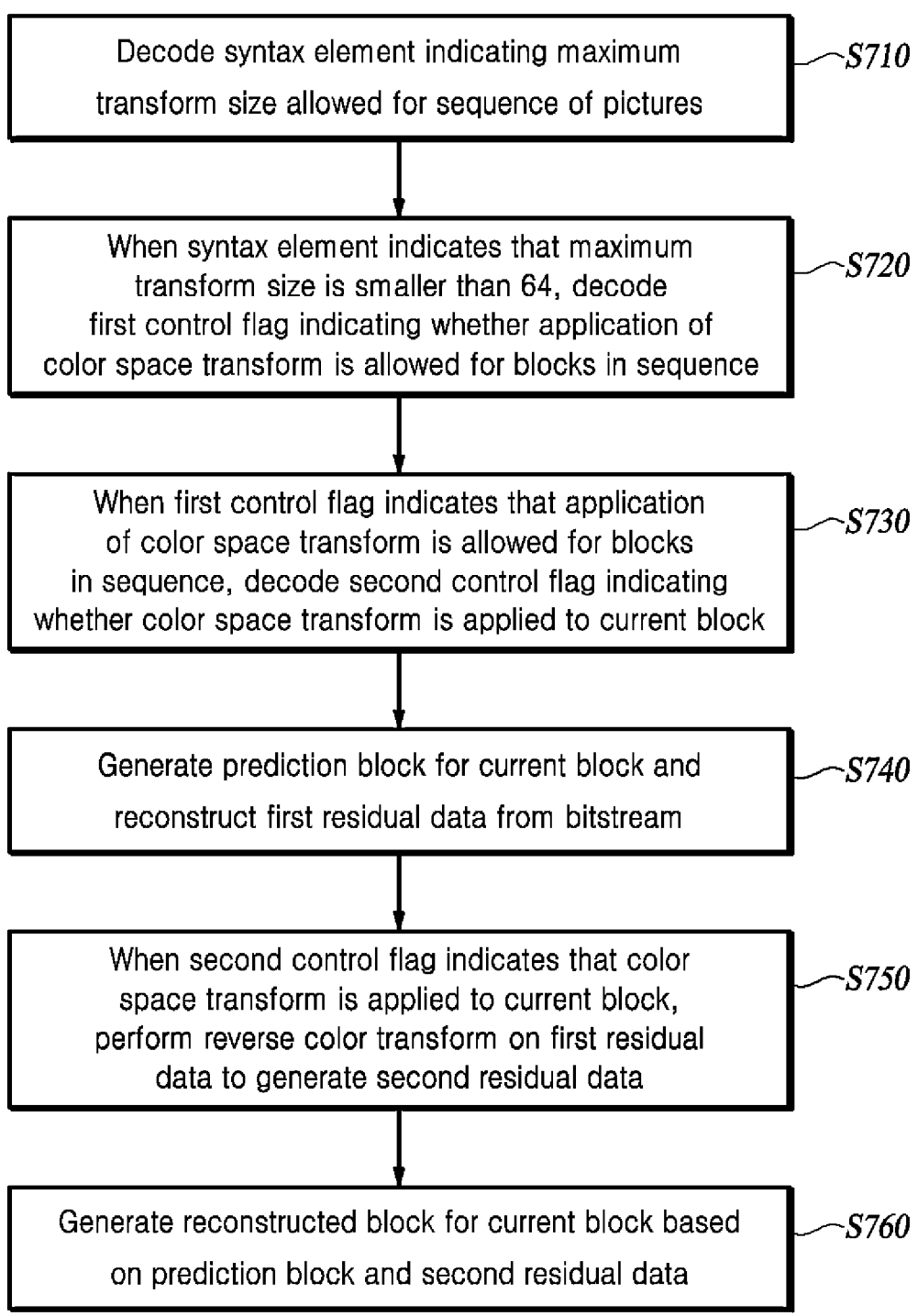

Decode syntax element indicating maximum transform size allowed for sequence of pictures — *S710*

When syntax element indicates that maximum transform size is smaller than 64, decode first control flag indicating whether application of color space transform is allowed for blocks in sequence — *S720*

When first control flag indicates that application of color space transform is allowed for blocks in sequence, decode second control flag indicating whether color space transform is applied to current block — *S730*

Generate prediction block for current block and reconstruct first residual data from bitstream — *S740*

When second control flag indicates that color space transform is applied to current block, perform reverse color transform on first residual data to generate second residual data — *S750*

Generate reconstructed block for current block based on prediction block and second residual data — *S760*

*FIG. 7*

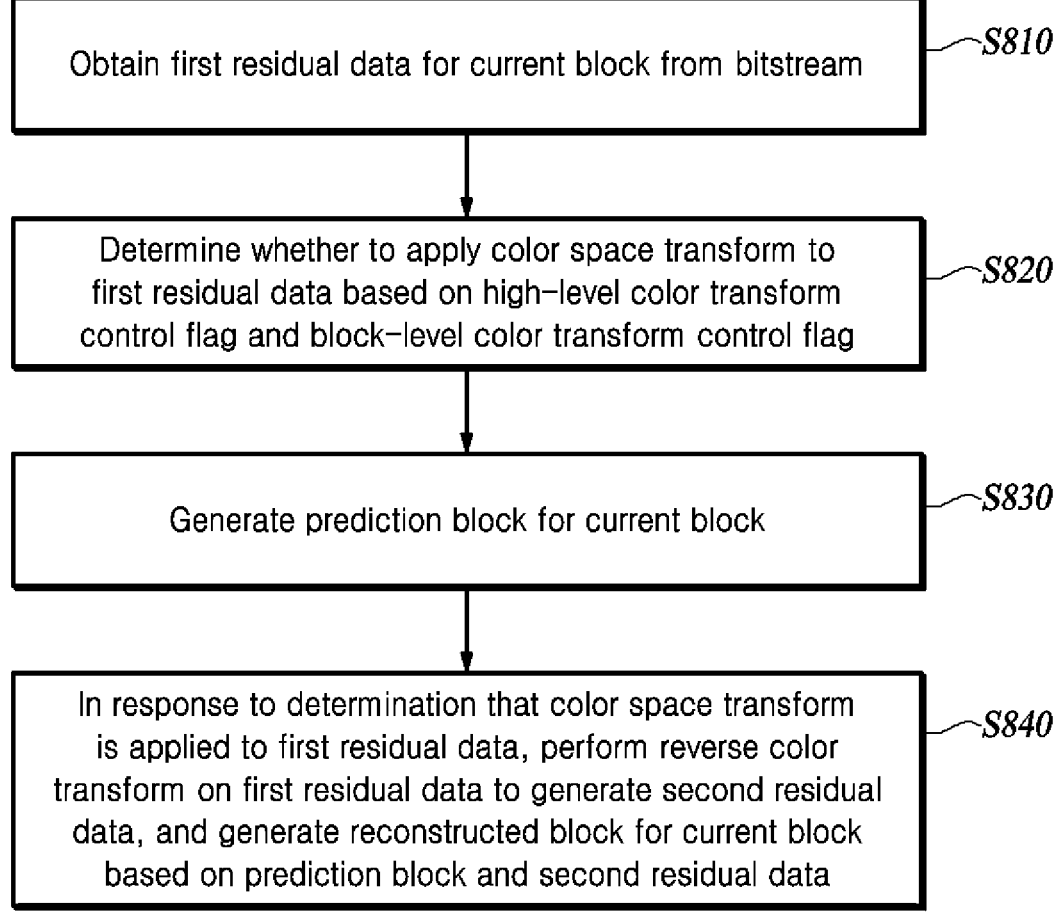

Obtain first residual data for current block from bitstream ⟶ *S810*

Determine whether to apply color space transform to first residual data based on high-level color transform control flag and block-level color transform control flag ⟶ *S820*

Generate prediction block for current block ⟶ *S830*

In response to determination that color space transform is applied to first residual data, perform reverse color transform on first residual data to generate second residual data, and generate reconstructed block for current block based on prediction block and second residual data ⟶ *S840*

FIG. 8

VIDEO ENCODING AND DECODING USING ADAPTIVE COLOR TRANSFORM

CROSS-REFERENCE TO RELATED APPLICATIONS

This application is a continuation of non-provisional U.S. patent application Ser. No. 17/792,460, filed on Jul. 13, 2022, which was the U.S. national stage of International Application No. PCT/KR2021/000527, filed on Jan. 14, 2021, which claims priority to Korean Patent Application No. 10-2020-0004645, filed on Jan. 14, 2020, Korean Patent Application No. 10-2020-0022425, filed on Feb. 24, 2020, and Korean Patent Application No. 10-2021-0005127, filed on Jan. 14, 2021, the entire contents of each of which are incorporated herein by reference.

TECHNICAL FIELD

The present disclosure relates to video encoding and decoding. More particularly, the present disclosure relates to video encoding and decoding using adaptive color transform to a residual signal.

BACKGROUND

Since the volume of video data is larger than that of voice data or still image data, storing or transmitting video data without processing the video data by compression requires a lot of hardware resources including memory.

Accordingly, when video data is stored or transmitted, the video data is generally compressed using an encoder so as to be stored or transmitted. Then, a decoder receives the compressed video data, and the decoder decompresses and reproduces the video data. Compression techniques for such video include H.264/AVC and High Efficiency Video Coding (HEVC), which improves coding efficiency over H.264/AVC by about 40%.

We have discovered that because the size and resolution and frame rate of pictures constituting a video are increasing more and more, and thus the amount of data to be encoded is also increasing, it is desired to develop a new compression technology that has better encoding efficiency and greatly improves picture quality.

SUMMARY

The present disclosure presents some improved schemes that efficiently operate adaptive color transform in addition to reducing a maximum memory size required for the adaptive color transform.

An aspect of the present disclosure provides a method for decoding video data. The method comprises obtaining first residual data for a current block from a bitstream and determining whether to apply color space transform to the first residual data based on a high-level color transform control flag and a block-level color transform control flag. The method further comprises generating second residual data by performing reverse color transform on the first residual data in response to a determination that the color space transform is applied to the first residual data. The method further comprises generating a prediction block for the current block and generating a reconstructed block for the current block based on the prediction block and the second residual data.

An aspect of the present disclosure provides an apparatus for decoding video data. The apparatus comprises one or more processors, which are configured to obtain first residual data for a current block from a bitstream; determine whether to apply color space transform to the first residual data based on a high-level color transform control flag and a block-level color transform control flag; and generate second residual data by performing reverse color transform on the first residual data in response to a determination that the color space transform is applied to the first residual data. The one or more processors are further configured to generate a prediction block for the current block and generate a reconstructed block for the current block based on the prediction block and the second residual data.

The high-level color transform control flag is signaled in the bitstream depending on a maximum transform size allowed in a sequence of pictures including the current block. The block-level color transform control flag is signaled in the bitstream depending on the high-level color transform control flag. When the high-level color transform control flag and the block-level color transform control flag are not signaled, the high-level color transform control flag and the block-level color transform control flag are inferred to be false.

An aspect of the present disclosure provides a method for decoding video data. The method comprises decoding a syntax element indicating a maximum transform size allowed for a sequence of pictures of the video data from a bitstream. The method further comprises decoding a first control flag indicating whether application of color space transform is allowed for blocks within the sequence from the bitstream when the syntax element indicates that the maximum transform size is smaller than 64. The method further comprises decoding a second control flag indicating whether the color space transform is applied to the current block in the sequence from the bitstream when the first control flag indicates that the application of the color space transform is allowed for the blocks within the sequence. The method further comprises reconstructing first residual data for the current block from the bitstream and performing reverse color transform on the first residual data to generate second residual data, when the second control flag indicates that the color space transform is applied to the current block. The method further comprises generating a prediction block for the current block and generating a reconstructed block for the current block based on the prediction block and the second residual data.

BRIEF DESCRIPTION OF THE DRAWINGS

FIG. 6 is a flowchart illustrating a method for encoding video data according to an aspect of the present disclosure.

FIG. 7 is a flowchart illustrating a method for decoding video data according to an aspect of the present disclosure.

FIG. 8 is a flowchart illustrating a method for decoding video data according to another aspect of the present disclosure.

DESCRIPTION OF EMBODIMENTS

Figure 1:
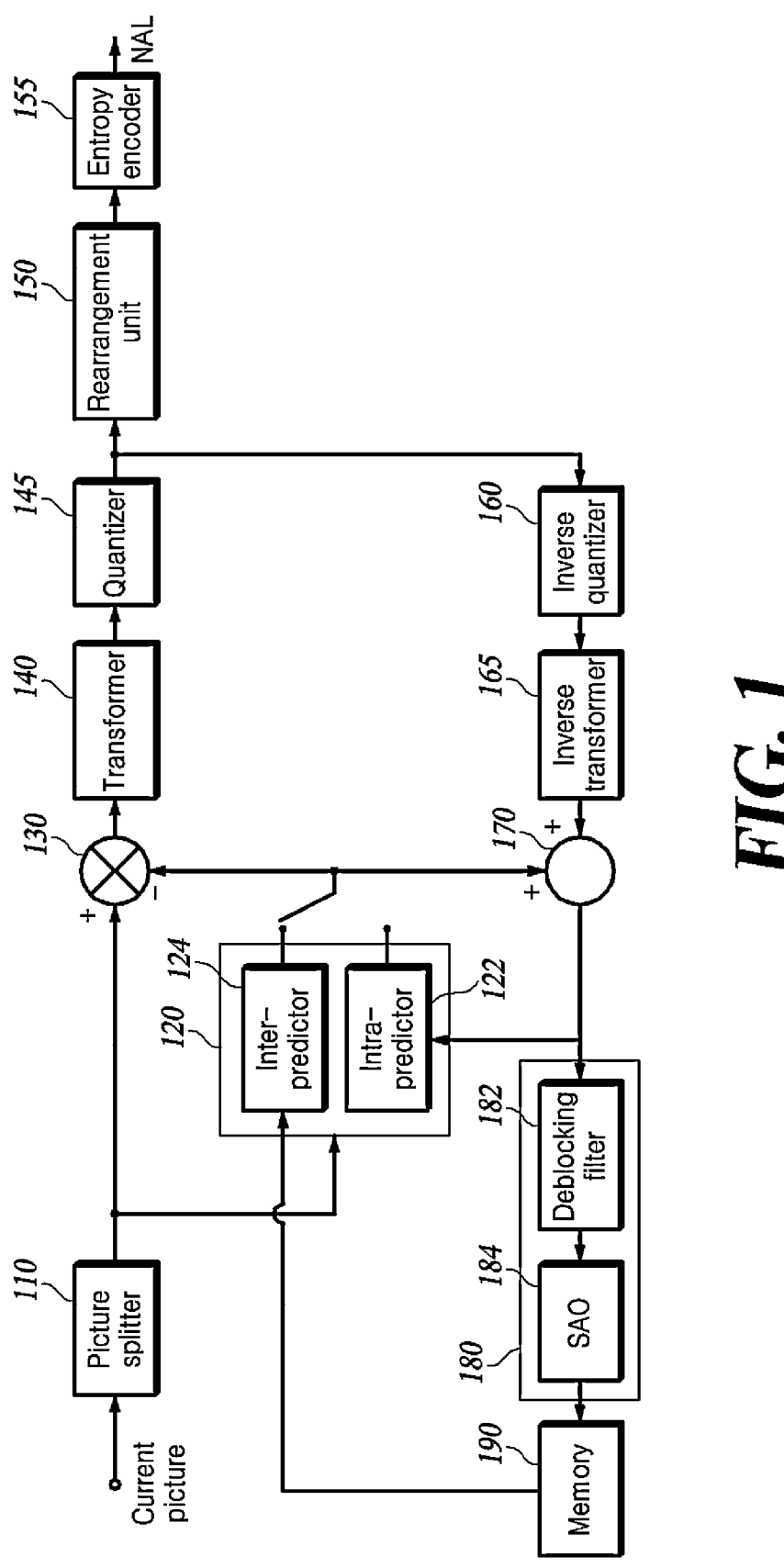
FIG. 1 is a block diagram of a video encoding apparatus capable of implementing the techniques of the present disclosure.

Hereinafter, some embodiments of the present disclosure are described in detail with reference to the accompanying drawings. It should be noted that, in assigning reference numerals to the constituent elements in the respective drawings, like reference numerals designate like elements, although the elements are shown in different drawings. Further, in the following description of the present disclosure, a detailed description of known functions and configurations incorporated herein has been omitted to avoid obscuring the subject matter of the present disclosure. When a component, device, element, or the like of the present disclosure is described as having a purpose or performing an operation, function, or the like, the component, device, or element should be considered herein as being "configured to" meet that purpose or to perform that operation or function.

FIG. 1 is a block diagram of a video encoding apparatus capable of implementing the techniques of the present disclosure. Hereinafter, a video encoding apparatus and elements of the apparatus is described with reference to FIG. 1.

The video encoding apparatus includes a picture splitter 110, a predictor 120, a subtractor 130, a transformer 140, a quantizer 145, a reorganizer 150, an entropy encoder 155, an inverse quantizer 160, an inverse transformer 165, an adder 170, a loop filter unit 180, and a memory 190.

Each element of the video encoding apparatus may be implemented in hardware, software, or a combination of hardware and software. The functions of the respective elements may be implemented as software, and a microprocessor may be implemented to execute the software functions corresponding to the respective elements.

One video includes a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting one or more pictures is encoded in a picture parameter set (PPS) or a picture header. Furthermore, information, which a sequence composed of a plurality of pictures refers to in common, is encoded in a sequence parameter set (SPS). Information applied to one tile or tile group in common may be encoded as a syntax of a tile or tile group header.

The picture splitter 110 determines the size of a coding tree unit (CTU). Information about the size of the CTU (CTU size) is encoded as a syntax of the SPS or PPS and is transmitted to the video decoding apparatus.

The picture splitter 110 splits each picture constituting the video into a plurality of CTUs having a predetermined size and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size. The tree structure may also be a Binary Tree (BT), in which a node is split into two sub-nodes. The tree structure may also be a TernaryTree (TT), in which a node is split into three sub-nodes at a ratio of 1:2:1. The tree structure may also be a structure formed by a combination of two or more of the QT structure, the BT structure, and the TT structure. For example, a QuadTree plus BinaryTree (QTBT) structure may be used, or a QuadTree plus Binary Tree TernaryTree (QTBTTT) structure may be used. Here, BTTT may be collectively referred to as a multiple-type tree (MTT).

Figure 2:
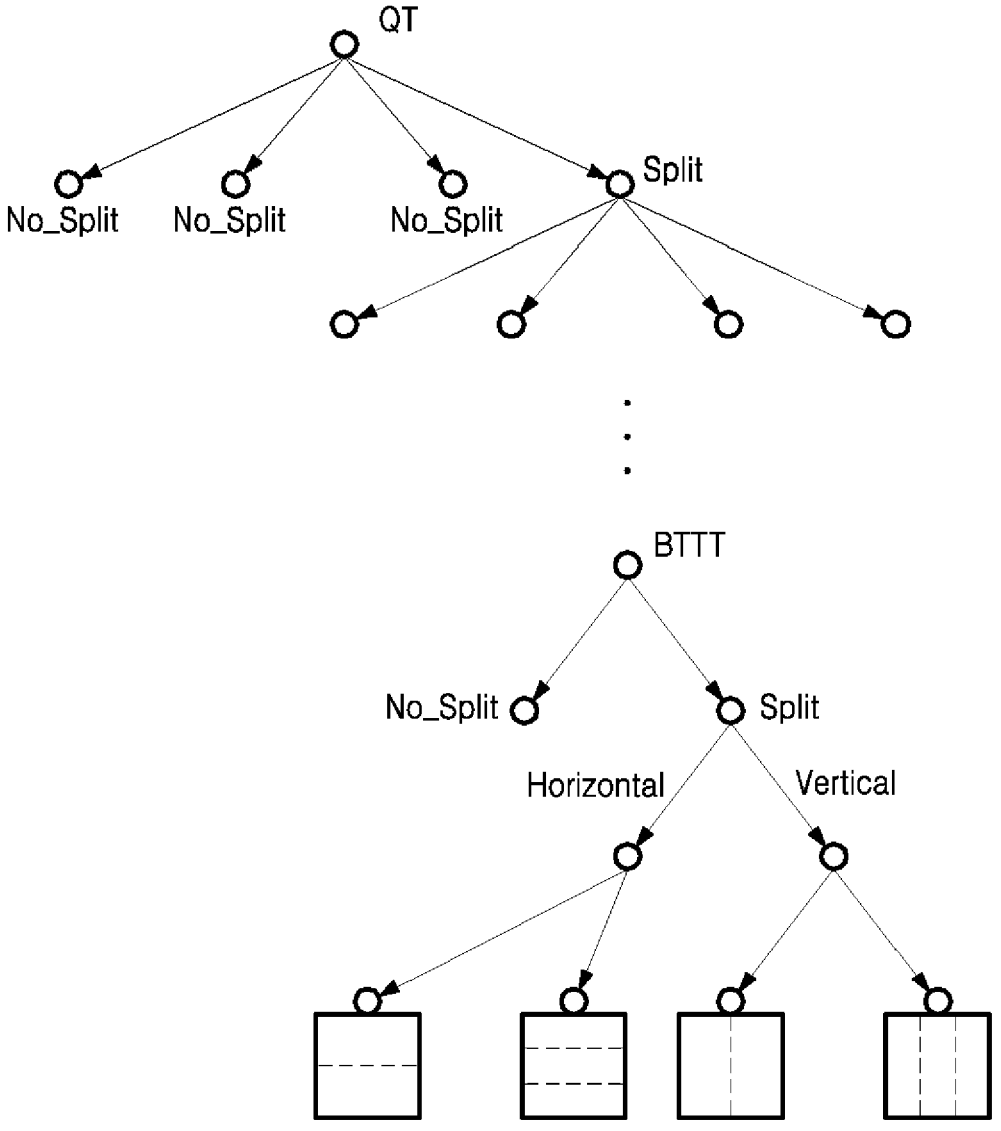
FIG. 2 is a diagram illustrating block splitting using a QuadTree plus BinaryTree Ternary Tree (QTBTTT) structure.

FIG. 2 shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3 or may include a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 predicts the current block to generate a prediction block. The predictor 120 includes an intra-predictor 122 and an inter-predictor 124.

Figure 3:
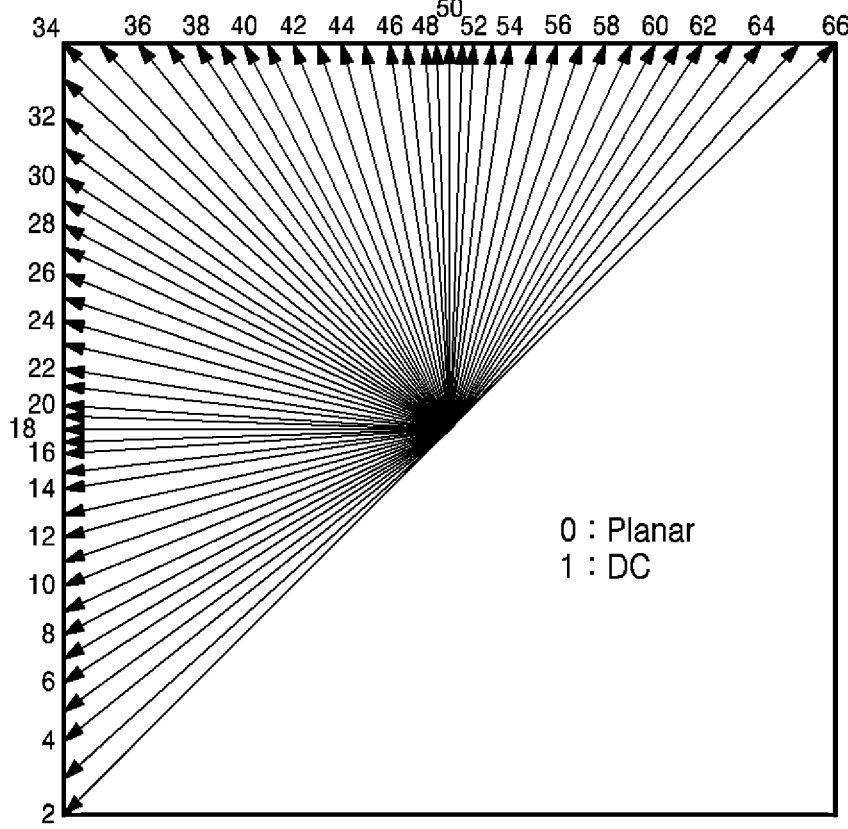
FIG. 3 is a diagram illustrating a plurality of intra-prediction modes.

The intra-prediction unit 122 predicts pixels in the current block using pixels (reference pixels) positioned around the current block in the current picture including the current block. There is a plurality of intra-prediction modes according to the prediction directions. For example, as shown in FIG. 3, the plurality of intra-prediction modes may include two non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes and may select an intra-prediction mode that has the best rate distortion characteristics among the tested modes.

The intra-predictor 122 selects one intra-prediction mode from among the plurality of intra-prediction modes and predicts the current block using neighboring pixels (reference pixels) and an equation determined according to the selected intra-prediction mode. Information about the selected intra-prediction mode is encoded by the entropy encoder 155 and transmitted to the video decoding apparatus.

The inter-predictor 124 generates a prediction block for the current block through motion compensation. The inter-predictor 124 searches for a block most similar to the current block in a reference picture, which has been encoded and decoded earlier than the current picture. The inter-predictor 124 also generates a prediction block for the current block using the searched block. Then, the inter-predictor 124 generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus. The inter-predictor 124 may perform interpolation on a reference picture or a reference block in order to increase the accuracy of prediction. In other words, subpixels between two consecutive integer pixels are interpolated by applying filter coefficients to a plurality of consecutive integer pixels including the two integer pixels. When a process of searching for a block that is most similar to the current block for the interpolated reference picture is performed, the motion vector may be expressed not to the precision of the integer pixel but to the precision of the decimal unit. The precision or resolution of the motion vector may be set differently for each unit of a target region to be encoded, such as a slice, tile, CTU, or CU.

The subtractor 130 subtracts the prediction block generated by the intra-predictor 122 or the inter-predictor 124 from the current block to generate a residual block.

The transformer 140 may transform residual signals in a residual block. A two-dimensional size of the residual block may be used as a transform unit (hereinafter, "TU"), a block size in which the transform is performed. Alternatively, the residual block may be partitioned into a plurality of sub-blocks, and each subblock may be used as a TU to transform the residual signals within the corresponding subblock.

The transformer 140 may split the residual block into one or more subblocks and apply the transformation to the one or more subblocks. Thus, the residual values of the transform blocks may be transformed from the pixel domain to the frequency domain. In the frequency domain, the transformed blocks are referred to as coefficient blocks or transform blocks containing one or more transform coefficient values. A two-dimensional transform kernel may be used for transformation and one-dimensional transform kernels may be used for horizontal transformation and vertical transformation, respectively. The transform kernels may be based on a discrete cosine transform (DCT), a discrete sine transform (DST), or the like.

The transformer 140 may individually transform the residual block in a horizontal direction and a vertical direction. For transformation, various types of transform functions or transform matrices may be used. For example, a pair of transform functions for transformation in the horizontal direction and the vertical direction may be defined as a multiple transform set (MTS). The transformer 140 may select one transform function pair having the best transform efficiency in the MTS and transform the residual block in the horizontal and vertical directions, respectively. Information (mts_idx) on the transform function pair selected from the MTS is encoded by the entropy encoder 155 and signaled to the video decoding apparatus.

The quantizer 145 quantizes transform coefficients output from the transformer 140 using quantization parameters and outputs the quantized transform coefficients to the entropy encoder 155. For some blocks or frames, the quantizer 145 may directly quantize a related residual block without transformation. The quantizer 145 may apply different quantization coefficients (scaling values) according to positions of the transform coefficients in the transform block. A matrix of quantization coefficients applied to quantized transform coefficients arranged in two dimensions may be encoded and signaled to the video decoding apparatus.

The reorganizer 150 may reorganize the coefficient values for the quantized residual value. The reorganizer 150 may change the 2-dimensional array of coefficients into a 1-dimensional coefficient sequence through coefficient scanning. For example, the reorganizer 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan in which a two-dimensional array of coefficients is scanned in a column direction or a horizontal scan in which two-dimensional block-shaped coefficients are scanned in a row direction may be used instead of the zig-zag scan. In other words, a scan mode to be used may be determined among the zig-zag scan, the diagonal scan, the vertical scan, and the horizontal scan according to the size of the transformation unit and the intra-prediction mode.

The entropy encoder 155 encodes the one-dimensional quantized transform coefficients output from the reorganizer 150 using various encoding techniques, such as Context-based Adaptive Binary Arithmetic Code (CABAC) and exponential Golomb, to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction and encodes intra-prediction information (i.e., information about an intra-prediction mode) or inter-prediction information (information about a reference picture index and a motion vector) according to the prediction type. In addition, the entropy encoder 155 encodes information related to quantization, i.e., information on quantization parameters and information on a quantization matrix.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference pixels in performing intra-prediction of a next block.

The loop filter unit 180 filters the reconstructed pixels to reduce blocking artifacts, ringing artifacts, and blurring artifacts generated due to block-based prediction and transformation/quantization. The loop filter unit 180 may include one or more of a deblocking filter 182, a sample adaptive offset (SAO) filter 184, or an adaptive loop filter (ALF) 186.

The deblocking filter 182 filters the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed pixel and an original pixel caused by lossy coding and performs filtering in a manner of adding a corresponding offset to each reconstructed pixel. The ALF 186 performs filtering on a target pixel to be filtered by applying filter coefficients to the target pixel and neighboring pixels of the target pixel. The ALF 186 may divide the pixels included in a picture into predetermined groups and then determine one filter to be applied to a corresponding group to differentially perform filtering on each group. Information about filter coefficients to be used for the ALF may be encoded and signaled to the video decoding apparatus.

The reconstructed blocks filtered through the loop filter unit 180 are stored in the memory 190. Once all blocks in one picture are reconstructed, the reconstructed picture may be used as a reference picture for inter-prediction of blocks in a picture to be encoded next.

Figure 4:
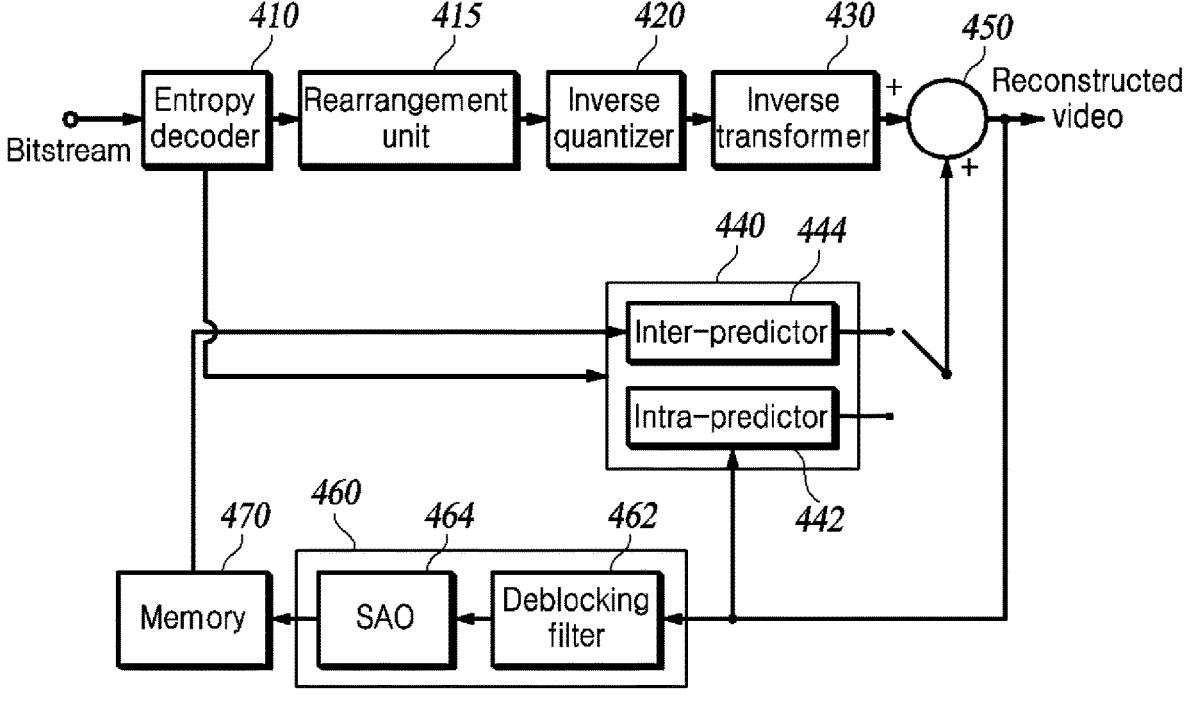
FIG. 4 is a block diagram of a video decoding apparatus capable of implementing the techniques of the present disclosure.

FIG. 4 is a functional block diagram of a video decoding apparatus capable of implementing the techniques of the present disclosure. Hereinafter, the video decoding apparatus and elements of the apparatus are described with reference to FIG. 4.

The video decoding apparatus may include an entropy decoder 410, a reorganizer 415, an inverse quantizer 420, an inverse transformer 430, a predictor 440, an adder 450, a loop filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 determines a current block to be decoded by decoding a bitstream generated by the video encoding apparatus and extracting information related to block splitting. The entropy decoder 410 also extracts prediction information and information about a residual signal, and the like required to reconstruct the current block.

The entropy decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, i.e., the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Each node below the leaf node of QT is thereby recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 extracts information about a prediction type indicating whether the current block is intra-predicted or inter-predicted. When the prediction type information indicates intra-prediction, the entropy decoder 410 extracts a syntax element for the intra-prediction information (intra-prediction mode) for the current block. When the prediction type information indicates inter-prediction, the entropy decoder 410 extracts a syntax element for the inter-prediction information, i.e., information indicating a motion vector and a reference picture referred to by the motion vector.

The entropy decoder 410 also extracts information about quantized transform coefficients of the current block as information related to quantization and information about residual signals.

The reorganizer 415 may change the sequence of the one-dimensional quantized transform coefficients entropy-decoded by the entropy decoder 410 to a 2-dimensional coefficient array (i.e., block) in a reverse order of the coefficient scanning performed by the video encoding apparatus.

The inverse quantizer 420 inversely quantizes the quantized transform coefficients using the quantization parameter. The inverse quantizer 420 may apply different quantization coefficients (scaling values) to the quantized transform coefficients arranged in two dimensions. The inverse quantizer 420 may perform inverse quantization by applying a matrix of quantization coefficients (scaling values) from the video encoding apparatus to a two-dimensional array of quantized transform coefficients.

The inverse transformer 430 inversely transforms the inversely quantized transform coefficients from the frequency domain to the spatial domain to reconstruct residual signals. A reconstructed residual block for the current block is thereby generated. In addition, when the MTS is applied, the inverse transformer 430 determines transform functions or transform matrices to be applied in the horizontal and vertical directions, respectively, using the MTS information (mts_idx) signaled from the video encoding apparatus. The inverse transformer 430 also uses the determined transform functions to inversely transform the transform coefficients in the transform block in the horizontal and vertical directions.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on the syntax element for the intra-prediction mode extracted from the entropy decoder 410 and predicts the current block using the reference pixels around the current block according to the intra-prediction mode.

The inter-predictor 444 determines a motion vector of the current block and a reference picture referred to by the motion vector using the syntax element for the intra-prediction mode extracted from the entropy decoder 410 and predicts the current block based on the motion vector and the reference picture.

The adder 450 reconstructs the current block by adding the residual block output from the inverse transformer and the prediction block output from the inter-predictor or the intra-predictor. The pixels in the reconstructed current block are used as reference pixels in intra-predicting a block to be decoded next.

The loop filter unit 460 may include at least one of a deblocking filter 462, an SAO filter 464, or an ALF 466. The deblocking filter 462 deblocking-filters the boundary between the reconstructed blocks to remove blocking artifacts caused by block-by-block decoding. The SAO filter 464 performs filtering in a manner of adding the reconstructed block after deblocking filtering to corresponding offsets so as to compensate for a difference between the reconstructed pixel and the original pixel caused by lossy coding. The ALF 466 performs filtering on a target pixel to be filtered by applying filter coefficients to the target pixel and neighboring pixels of the target pixel. The ALF 466 may divide the pixels in a picture into predetermined groups and then may determine one filter to be applied to a corresponding group to differentially perform filtering on each group. The filter coefficient of the ALF is determined based on the information about the filter coefficient decoded from the bitstream.

The reconstructed block filtered through the loop filter unit 460 is stored in the memory 470. When all blocks in one picture are reconstructed, the reconstructed picture is used as a reference picture for inter-prediction of blocks in a picture to be encoded next.

The technologies of the present disclosure are generally related to applying color space transform to coding of video data. The following description is basically focused on a decoding technology, i.e., an operation of a video decoder.

A description of encoding technologies is opposite to a decoding technology that is comprehensively described and thus the description of encoding technologies is simplified.

Most screen contents are captured in an RGB color space instead of a YCbCr color space. With respect to each image block in the RGB color space, there is generally a strong relation between different color components. If the RGB data is directly compressed without color space transform, redundancy between color channels is not reduced, and as a result, coding efficiency may be reduced. In order to remove a redundancy between the color components, the color space may be transformed to another color space. The terms "color space transform" and "color transform" are the same as each other and may be used compatibly with each other.

YCbCr is frequently used for expressing the color of the compressed video data in that there is little redundant data among y, Cb, and Cr components. Accordingly, coding the video data using YCbCr color expression (also referred to as color format) provides an excellent compression capability in many cases. A YCoCg color space has an advantage that a calculation is simpler and faster, and a correlation between the color components is lower than the YCbCr color space. However, the color transform may cause color distortion, which leads to subjective quality deterioration.

In HEVC Screen Content Coding (SCC), as a technology that adaptively transforms the residual signal after prediction from the RGB or YUV color space to the YCgCo space, adaptive color transform (ACT) is used. One ACT flag is used for each transform unit (TU) to adaptively select one of two color spaces. When the ACT flag is equal to 1, a residual of the TU is encoded in the YCgCo space and if not, the residual of the TU is encoded in an original color space. In the case of video data in which a sampling ratio of the color format is 4:4:4, an ACT coding technology is usable for a VVC framework.

Figure 5:
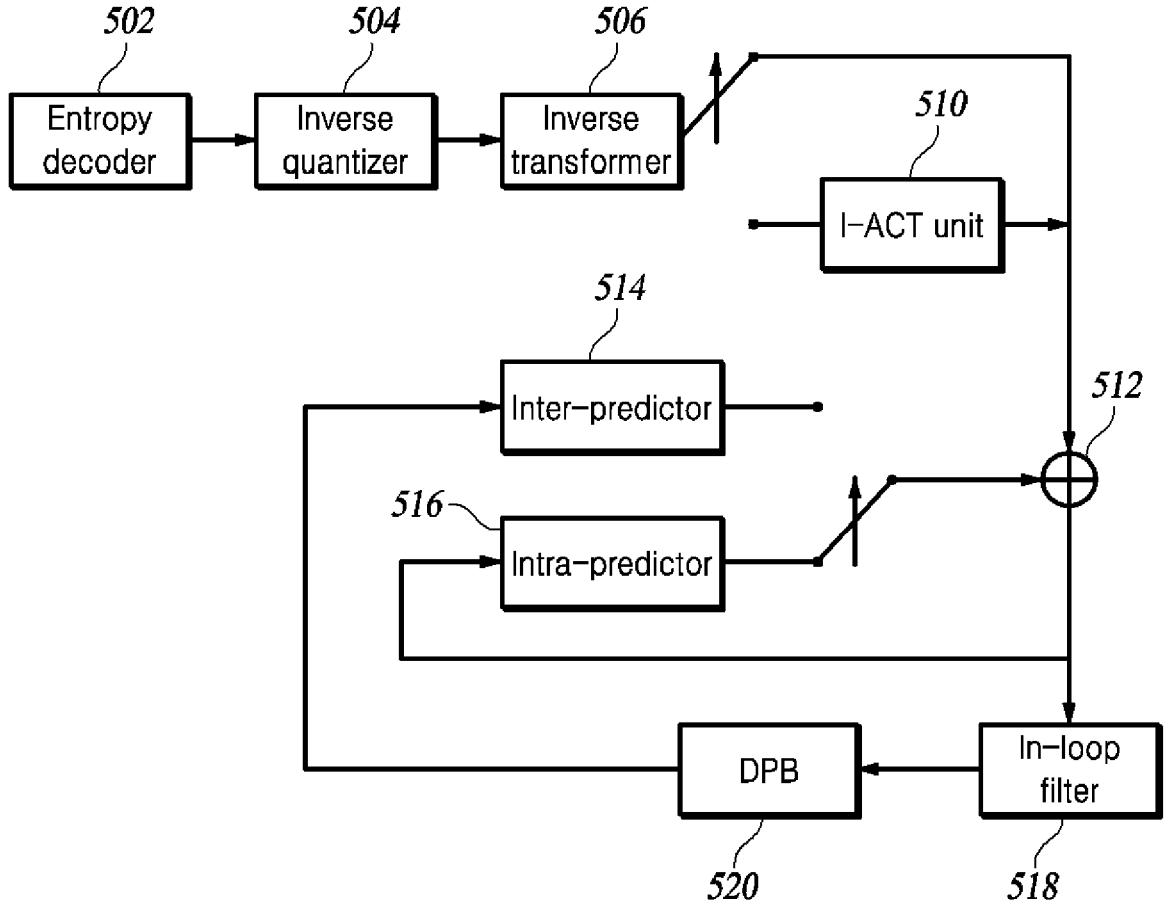
FIG. 5 is a schematic view of a video decoder adopting adaptive color transform which may be used in technologies of the present disclosure.

FIG. 5 is a schematic view of a video decoder adopting adaptive color transform which may be used in technologies of the present disclosure.

As illustrated in FIG. 5, the inverse ACT unit 510 is employed as one additional decoding module in order to transform the residual of a YCgCo space into an original color space after inverse transform performed by the inverse transformer 506. In other words, the color space transform is performed on a residual signal of a pixel domain.

The entropy decoder 502 decodes a coefficient level of a current block, and the inverse quantizer 504 and the inverse transformer 506 inversely quantize and inversely transform the coefficient level to reconstruct the residual of the current block. When a tree type is single tree partitioning and a corresponding high-level ACT flag is true, the entropy decoder 502 parses a block level ACT flag for the current block. When the block level ACT flag for the current block is true, the residual of the current block is processed by the inverse ACT unit 510 and if not, the residual of the current block is directly transferred to the adder 512. Since the color of the residual has been transformed from YCbCr (or RGB) to YCoCg by the video encoder, the inverse ACT unit 510 transforms the residual back into YCbCr (or RGB) for reconstruction. A prediction block for the current block is generated by the inter predictor 514 or the intra predictor 516 and is added to the residual of the current block by the adder 512 in order to reconstruct the current block. The reconstructed current block is processed by the in-loop filters 518 in order to enhance the image quality. The filtered picture is stored in a decoded picture block 520 to be referenced by the inter prediction module.

In the VVC framework, when the maximum transform size is not smaller than a width or a height of a CU, the CU is also used as a unit of a transform process. Accordingly, the block level ACT flag may be signaled as a CU syntax. Further, since the ACT is to perform additional (inverse) transform on the residual signal, the ACT is used only when at least non-zero transform coefficient is present in the case of a CU to be encoded with inter prediction and intra block copy (IBC). In the CU, the ACT is activated only when the prediction mode of the chroma components is the same as the luma component, i.e., a DM mode is selected for the chroma components. Further, in order to compensate for a dynamic range change of the residual signal after the color transform, a QP offset set (−5, −5, −3) is applied to a transformed residual.

The adaptive color transform (ACT) may use forward color transform and reverse color transform as in [Equation 1] using a pair of YCoCg transform matrixes in order to transform sample values from the YCbCr color space to the YCoCg color space and back to the original color space. Compared to the YCbCr color space, the YCoCg color space has an advantage of simpler and faster computation, and the lower correlation between the color components.

$$\begin{bmatrix} C'_0 \\ C'_1 \\ C'_2 \end{bmatrix} = \frac{\begin{bmatrix} 2 & 1 & 1 \\ 2 & -1 & -1 \\ 0 & -2 & 2 \end{bmatrix} \begin{bmatrix} C_0 \\ C_1 \\ C_2 \end{bmatrix}}{4} \quad \text{[Equation 1]}$$

$$\begin{bmatrix} C_0 \\ C_1 \\ C_2 \end{bmatrix} = \begin{bmatrix} 1 & 1 & 0 \\ 1 & -1 & -1 \\ 1 & -1 & 1 \end{bmatrix} \begin{bmatrix} C'_0 \\ C'_1 \\ C'_2 \end{bmatrix}$$

Here, [C0, C1, C2] corresponds to [Cb, Cr, Y].

The adaptive color transform (ACT) may use forward and reverse color transforms as in [Equation 2] using a pair of YCoCg transform matrixes in order to transform sample values from the RGB color space to the YCoCg color space and back to the original color space.

$$\begin{bmatrix} C'_0 \\ C'_1 \\ C'_2 \end{bmatrix} = \frac{\begin{bmatrix} 1 & 2 & 1 \\ 2 & 0 & -2 \\ -1 & 2 & -1 \end{bmatrix} \begin{bmatrix} C_0 \\ C_1 \\ C_2 \end{bmatrix}}{4} \quad \text{[Equation 1]}$$

$$\begin{bmatrix} C_0 \\ C_1 \\ C_2 \end{bmatrix} = \begin{bmatrix} 1 & 1 & -1 \\ 1 & 0 & 1 \\ 1 & -1 & -1 \end{bmatrix} \begin{bmatrix} C'_0 \\ C'_1 \\ C'_2 \end{bmatrix}$$

Here, [C0, C1, C2] corresponds to [R, G, B].

The high-level ACT flag is transmitted at a sequence level such as a sequence parameter set (SPS) or at a picture level such as a picture parameter set (PPS) to indicate whether the ACT is activated or deactivated for the sequence or the picture. For example, when the high-level ACT flag is false ("0"), the ACT is deactivated for all blocks in the sequence or the picture, while when the high-level ACT flag is true ("1"), one or more block level ACT flags indicating whether the ACT is activated or deactivated for one or more blocks in the sequence or picture are transmitted.

1. ACT Memory Bandwidth Limitation

The adaptive color transform (ACT) uses all of three components of the residual signal in the forward and reverse color transform processes, so when at least one of the three components is unavailable, the use of the ACT is not allowed. For example, when the luma and chroma components are partitioned in separate tree structures and separately encoded, the use of the ACT is not allowed. In other words, the use of the ACT may be allowed only for a block partitioned in a single tree partitioning.

Accordingly, when the high-level ACT flag is true ("1") and the single tree block partitioning is used to determine a luma block and two chroma blocks of the current CU, the block level ACT flag is signaled for the current CU. When the block level ACT flag for the current CU is true ("1"), a color space of residuals of the current CU are transformed by the color transform. When the block level ACT flag for the current CU is true ("0") or the bock level ACT flag is not signaled for the current CU, the ACT is deactivated for the current CU. Similarly, when intra sub-partition prediction (ISP) is applied only to the luma component and not applied to the chroma components, the block level ACT flag is not signaled for the current CU, and the ACT is deactivated.

Since the adaptive color transform (ACT) requires all of three color components, a memory for temporarily storing the sample values of each component is required between inverse transform and inverse ACT. Accordingly, as the maximum transform size allowed in a video codec increases, a larger memory bandwidth may be required to store and transfer samples of transformed residual data in hardware implementation of video encoders/decoders. For example, in a VVC standard draft, up to 64-point transform is allowed, and as a result, up to 64×64×3 values of color components need to be stored for the inverse ACT.

According to an aspect of the present disclosure, several schemes for reducing the maximum memory size required by the adaptive color transform (ACT) are introduced.

A first scheme is to control whether the ACT is allowed by relying on the high-level syntax indicating the maximum transform size and thus limit the size of the transform unit which the ACT is used. As an example, a syntax element (e.g., 1-bit flag) indicating the maximum transform size allowed for luma blocks included a sequence of the pictures in the sequence parameter set (SPS) may be signaled. When the syntax element is equal to "1", the maximum transform size for the luma samples may be 64, and when the syntax element is equal to "0", the maximum transform size may be 32. Accordingly, the video encoder may signal the high-level ACT flag only when the syntax element is equal to "0" so that the activation of the ACT is allowed only when the maximum transform size is 32. Accordingly, the ACT requires a memory bandwidth corresponding to values of a maximum of 32×32×3 color components.

A second scheme is to control the activation of the ACT at a block level by relying on the size of the CU or TU to limit the application of the ACT for large blocks. In other words, the scheme controls signaling of the ACT flag at the block level depending on the size of the CU, instead of controlling the signaling of the high-level ACT flag by relying on the maximum transform size. A table below shows an exemplary coding unit syntax according to such a scheme. In the exemplified syntax, graying of elements is used for representing potential changes or assisting appreciation in the syntax.

TABLE 1

```
coding_unit( x0, y0, cbWidth, cbHeight, cqtDepth, treeType, modeType ) {
. . .
    if( CuPredMode[ chType ][ x0 ][ y0 ] == MODE_INTRA && sps_act_enabled_flag &&
        treeType = = SINGLE TREE ) && cbWidth <= 32 && cbHeight <= 32 )
        cu_act_enabled_flag
. . .
    if( CuPredMode[ chType ][ x0 ][ y0 ] != MODE_INTRA && sps_act_enabled_flag &&
        treeType == SINGLE TREE ) && cbWidth <= 32 && cbHeight <= 32)
        cu_act_enabled_flag
```

According to the first scheme, when the maximum transform size indicated at the SPS level is 64, the ACT is deactivated for all blocks in a sequence (including blocks of 32×32). On the contrary, in the second scheme, the ACT may be selectively activated for blocks of 32×32 or less.

In a third scheme, when the ACT is activated for a 64×64 CU, the 64×64 CU is partitioned into, for example, four 32×32 subblocks to apply (inverse) transform, (inverse) quantization, and (inverse) ACT for each subblock. According to such a scheme, the use of the ACT is allowed even for the 64×64 CU, but the ACT still requires a memory bandwidth corresponding to up to 32×32×3 values of color components.

2. Combination of Inter Color Component Prediction and ACT

According to another aspect of the present disclosure, after removing the redundancy between the color components through the inter color component prediction, the color space transform is performed for the residual signals of the color components.

The video encoder may predict at least one of the color components of the current block from other color component(s) in order to generate the residual blocks of the color components to be used for the forward color transform. The video decoder may generate the prediction block by predicting at least one of the color components of the current block from other color component(s) and may add the generated prediction block to an associated residual block among the residual blocks of the color components obtained through the reverse color transform. As an example, the video encoder and the video decoder predict a second chroma component from a first chroma component to generate predicted values of the second chroma component and generate residual values of a second chroma component by subtracting the predicted values from original sample values of the second chroma component. As another example, the video encoder and the video decoder each predict the first and second chroma components from the luma component and generate the residual values of the first and second chroma components.

Specifically, the Cr component may be linearly predicted from the Cb component, and when the prediction values of the Cr component are "k*Cb", the residual of the Cr component to be input into the forward color transform of [Equation 1] may be "Cr−k*Cb". In particular, k may be pre-defined as "1", and modes using different values of k may also be introduced. For example, k may be set to either "+1" or "−1", and k selected by the video encoder may be signaled at the block level or slice level. Here, an operation of predicting the Cr component from the Cb component and generating the residual of the Cr component may be hidden in a forward color transform operation by replacing "C1" of [Equation 1] with "Cr−k*Cb". In other words, the forward color transform and the inter color component prediction may be integrated into one process.

When the prediction values of the Cr component are "k1*Cb+k2" by further generalizing a linear relationship between the Cb component and the Cr component, the residual of the Cr component to be input into the forward color transform of [Equation 1] may be "Cr−k1*Cb-k2". An operation of predicting the Cr component from the Cb component and generating the residual of the Cr component may be hidden in the forward color transform operation by replacing "C1" of [Equation 1] with "Cr−k1*Cb-k2".

In some embodiments, the chroma components may be predicted by a linear summation thereof. As an example, the prediction values of the Cb component may be determined as "(Cb+Cr)/2" and the prediction values of the Cr may be determined as "(Cb−Cr)/2". As another example, the prediction values of the Cb and Cr components may also be determined as "(1+k)Cb+(1−k)Cr" and "(1+k)Cb−(1−k)Cr", which are generalized expressions of the (weighted) linear summation of Cb and Cr. Here, the modes using different values of k may be introduced, and the mode may also be determined by using tu_cbf_cb and tu_cbf_cr of the block to which the corresponding pixel belongs. tu_cbf_cb and tu_cbf_cr are flags indicating whether the non-zero transform coefficient exists in the transform block for the Cb and Cr components.

Meanwhile, if there is a linear correlation (e.g., Cb=k*Cr) between the Cb component and the Cr component, the ACT may also use a reduced color transform matrix instead of [Equation 1] using a color transform matrix of 3×3. As an example, elements for one chroma component (e.g., Cr) are removed, and as a result, a color transform matrix of 3×2 may be used. As another example, in the color transform matrix of 3×3 in [Equation 1], a color transform matrix of 2×2 constituted only by four matrix coefficients on a top-left may be used. Alternatively, all matrix coefficients of a second row and a second column in the color transform matrix of 3×3 in [Equation 1] are replaced with 0, and as a result, the forward color transform of a form shown in [Equation 3] may also be performed. The video decoder may obtain Y and Cr residual signals through the reverse color transform of a form shown in [Equation 3] and then reconstruct the Cr residual signal according to the linear correlation between the Cb component and the Cr component. As a result, an operation and a delay required for color transform may be reduced.

$$\begin{bmatrix} C'_0 \\ C'_2 \end{bmatrix} = \frac{\begin{bmatrix} 2 & 0 & 1 \\ 0 & 0 & 0 \\ 0 & 0 & 2 \end{bmatrix} \begin{bmatrix} Cb \\ Y \end{bmatrix}}{2} \qquad \text{[Equation 3]}$$

$$\begin{bmatrix} Cb \\ Y \end{bmatrix} = \frac{\begin{bmatrix} 2 & 0 & -1 \\ 0 & 0 & 0 \\ 0 & 0 & 2 \end{bmatrix} \begin{bmatrix} C'_0 \\ C'_2 \end{bmatrix}}{2}$$

In the above examples, a YCbCr color format is exemplified, but it is apparent to those having ordinary skill in the art that a similar scheme may also be applied to another color format (R, G, B).

3. Limitation Between ACT and Cross Component Prediction

A Cross-Component Linear Model (CCLM) is a technology to improve encoding prediction performance by removing the redundancy which is present between the luma signal and the chroma signal. The CCLM predicts the chroma samples of a CU based on the reconstructed luma samples of the CU by using the following exemplary linear model of calculating a correlation between the chroma sample and the collocated reconstructed luma sample.

$$pred_c(i, j) = \alpha \cdot rec'_L(i, j) + \beta \qquad \text{[Equation 4]}$$

Here, $pred_c(i, j)$ represents the predicted chroma sample within the CU, and $rec'_L(i, j)$ is a downsampled sample of the reconstructed luma component of the CU. Linear model coefficients $\alpha$ and $\beta$ are not explicitly signaled, but derived from neighboring samples of the CU.

Since the ACT technology removes the redundancy between the color components, in order to prevent the interference between the ACT technology and the CCLM technology having similar characteristics, when any one technology is applied, the other technology may not be used. In an embodiment, the video encoder/decoder does not use the CCLM when the ACT is applied in the current CU. In other words, only when the ACT is not applied to the current CU, the CCLM is allowed to be used for the current CU. In another embodiment, when the current CU uses the CCLM, the ACT is not applied to the current CU. In other words, only when the CCLM is not used for the current CU, the ACT is allowed to be used for the current CU. In another embodiment, the CCLM and the ACT are controlled at the CU level or TU level so that only one of two is used. Alternatively, both the CCLM and the ACT may be used only for the block obtained by the single tree partitioning.

Joint coding of chroma residuals (JCCR) is a technology that jointly encodes the residual signals of the Cb and Cr components. More specifically, the video encoder transmits one signal resJointC[x][y], and the video decoder reconstructs resCb and resCr, which are residual signals of the Cb and Cr components in a predetermined scheme according to a JCCR mode. When tu_joint_cbcr_residual_flag is equal to 1, the video encoder/decoder may select the JCCR mode as in a table below based on a coded block flags (CBF) of the Cb and Cr components and CSign transmitted at the slice level. A TU level flag, tu_joint_cbcr_residual_flag, is used to signal whether JCCR is applied or not.

On the video encoder side, the JCCR technology is applied as follows. Modes 1, 2, and 3 used in the JCCR technology are applied only in I-slice, and only mode 2 is applied to P-slice and B-slice.

When the mode is 2, the video encoder generates resJointC as follows.

$$resJointC[x][y] = (resCb[x][y] + CSign * resCr[x][y])/2$$

When the mode is 1, the video encoder generates resJointC as follows.

$$resJointC[x][y] = (4*resCb[x][y] + 2*CSign*resCr[x][y])/5$$

When the mode is 3, the video encoder configures resJointC as follows.

$$resJointC[x][y] = (4*resCr[x][y] + 2*CSign*resCb[x][y])/5$$

When both the ACT and the JCCR are residual based coding tools, both the ACT and the JCCR may also be used for blocks obtained by the single tree partitioning. Accordingly, the video decoder may decode the residual signal of the luma component and resJointC[x][y] from the bitstream, reconstruct the residual signal of the Cb component and the residual signal of the Cr component from resJointC[x][y], and perform the reverse color transform on the residual signals.

Alternatively, when any one technology is applied, the other technology may not be used. For example, the ACT and the JCCR may be controlled at the CU level or TU level so that only one of two is used for a given CU or TU.

FIG. 6 is a flowchart illustrating a method for encoding video data using one or more techniques described above according to an aspect of the present disclosure.

The video encoder may encode a high-level syntax element indicating a maximum transform size allowed for a sequence of pictures of the video data in a bitstream (S610). The syntax element may be a 1-bit flag signaled in an SPS syntax. When the syntax element is equal to "1", the maximum transform size is 64 and when the syntax element is equal to "0", the maximum transform size is 32.

When the syntax element indicates that the maximum transform size is smaller than 64, the video encoder may encode into the bitstream a first control flag indicating whether the application of the color space transform is allowed for blocks within the sequence (S620). The first control flag may be signaled in the SPS syntax. When the first control flag is equal to "1", it is indicated that the

TABLE 2

| tu_cbf_cb | tu_cbf_cr | reconstruction of Cb and Cr residuals | mode |
|---|---|---|---|
| 1 | 0 | resCb[ x ][ y ] = resJointC[ x ][ y ]<br>resCr[ x ][ y ] = ( CSign * resJointC[ x ][ y ] ) >> 1 | 1 |
| 1 | 1 | resCb[ x ][ y ] = resJointC[ x ][ y ]<br>resCr[ x ][ y ] = CSign * resJointC[ x ][ y ] | 2 |
| 0 | 1 | resCb[ x ][ y ] = ( CSign * resJointC[ x][ y ] ) >> 1<br>resCr[ x ][ y] = resJointC[ x ][ y ] | 3 | application of the color space transform is allowed for the blocks within the sequence and when the first control flag is "0", it is indicated that the application of the color space transform is not allowed for the blocks within the sequence.

When the first control flag indicates that the application of the color space transform is allowed for the blocks within the sequence, the video encoder may encode into the bitstream a second control flag indicating whether the color space transform is applied to the current block within the sequence (S630). The second control flag may be a 1-bit flag included in the CU syntax or the TU syntax.

The video encoder may generate prediction values for a current block, that is one of the blocks within the sequence, and subtract the prediction values from original samples of the current block to generate a first residual data for the current block (S640). The first residual data may include respective residual blocks for the color components of the current block. The video encoder may predict at least one of the color components of the current block from other color component(s) of the current block in order to generate the residual blocks of the color components to be used for the forward color transform. The inter color component prediction may be to linearly predict a second chroma component from a first chroma component.

When the second control flag indicates that the color space transform is applied to the current block, the video encoder may perform the forward color transform on the first residual data of the current block to generate second residual data (i.e., forward color transformed residual data) and encode the second residual data into the bitstream (S650). On the contrary, when the second control flag indicates that the color space transform is not applied to the current block, the video encoder may encode the first residual data into the bitstream without performing the forward color transform on the first residual data of the current block.

FIG. 7 is a flowchart illustrating a method for decoding video data using one or more techniques described above according to an aspect of the present disclosure.

The video decoder may decode a high-level syntax element indicating a maximum transform size allowed for a sequence of pictures of the video data from a bitstream (S710). The syntax element may be a 1-bit flag signaled in an SPS syntax. When the syntax element is equal to "1", the maximum transform size may be 64 and when the syntax element is equal to "0", the maximum transform size may be 32.

When the syntax element indicates that the maximum transform size is smaller than 64, the video decoder may decode a first control flag indicating whether the application of the color space transform is allowed for blocks within the sequence from the bitstream (S720). The first control flag may be a 1-bit flag signaled in the SPS syntax. When the first control flag is true ("1"), it is indicated that the application of the color space transform is allowed for the blocks within the sequence, and when the first control flag is false ("0"), it is indicated that the application of the color space transform is not allowed for the blocks within the sequence.

When the first control flag indicates that the application of the color space transform is allowed for the blocks within the sequence, the video decoder may decode a second control flag indicating whether the color space transform is applied to the current block within the sequence from the bitstream (S730). The second control flag may be a 1-bit flag included in the CU syntax or the TU syntax. When the second control flag is true ("1"), the second control flag indicates that the color space transform is applied to the current block, and when the second control flag is false ("0"), the second control flag indicates that the color space transform is not applied to the current block.

The video decoder may generate a prediction block for the current block by performing inter prediction or intra prediction and may reconstruct first residual data (i.e., forward color transformed residual blocks) for the current block from the bitstream (S740). The first residual data may include respective residual blocks for the color components of the current block. The video decoder may predict at least one of the color components of the current block from other color component(s) in order to reconstruct the residual blocks of the color components.

When the second control flag indicates that the color space transform is applied to the current block, the video decoder may perform the reverse color transform on the first residual data to generate second residual data (i.e., reverse color transformed residual blocks) by (S750) and may add the second residual data to the prediction block in order to generate the reconstructed block for the current block (S760). On the contrary, when the second control flag indicates that the color space transform is not applied to the current block, the video decoder may add the first residual data to the prediction block in order to generate the reconstructed block for the current block.

FIG. 8 is a flowchart illustrating a method for decoding video data using one or more techniques described above according to another aspect of the present disclosure.

The video decoder obtains first residual data for a current block from a bitstream (S810). The first residual data includes residual data (residual block) for each of color components of the current block. The video decoder determines whether to apply color space transform to the first residual data based on a high-level color transform control flag and a block-level color transform control flag (S820). The high-level color transform control flag is signaled in the bitstream depending on a maximum transform size allowed in a sequence of pictures in which the current block is included.

For example, the video decoder decodes a syntax element indicating the maxim transform size allowed for the sequence of pictures from the bitstream, and when the syntax element indicates that the maximum transform size is smaller than a predetermined value, decodes the high-level color transform control flag from the bitstream. The high-level color transform control flag may be a 1-bit flag signaled in the SPS syntax. When the high-level color transform control flag is true ("1"), it is indicated that the application of the color space transform is allowed for the blocks in the sequence and when the high-level color transform control flag is false ("0"), it is indicated that the application of the color space transform is not allowed for the blocks in the sequence.

The block-level color transform control flag is signaled in the bitstream depending on the high-level color transform control flag. In other words, when the high-level color transform control flag indicates that the application of the color space transform is allowed for the blocks within the sequence, the video decoder decodes the block-level color transform control flag for the current block from the bitstream. The block-level color transform control flag may be a 1-bit flag included in the CU syntax or the TU syntax. When the block-level color transform control flag is true ("1"), the block-level color transform control flag indicates that the color space transform is applied to the current block, and when the block-level color transform control flag is false
("0"), it is indicated that the color space transform is not
applied to the current block.

When the high-level color transform control flag and the
block-level color transform control flag are not signaled in
the bitstream, the video decoder infers that the high-level
color transform control flag and the block-level color trans-
form control flag are false ('0').

The video decoder generates the prediction block for the
current block by performing inter prediction or intra predic-
tion (S830).

In response to determination that the color space trans-
form is applied to first residual data, the video decoder
performs reverse color transform on the first residual data to
generates second residual data and generates a reconstructed
block for the current block based on the prediction block and
the second residual data (S840). On the contrary, in response
to determination that the color space transform is not applied
to the first residual data, the video decoder generates the
reconstructed block for the current block based on the
prediction block and the first residual data.

The color space transform may be allowed only for blocks
obtained using a single tree partition. Accordingly, when the
luma component and the chroma components of the current
block are encoded by using a dual tree partition, the video
decoder infers that the block-level color transform control
flag is false ("0") (i.e., determines that the color space
transform is not applied to the current block).

The color space transform may be allowed only when a
chroma sampling format is 4:4:4. Accordingly, when the
chroma sampling format for the video data is a chroma
sampling format other than 4:4:4, the video decoder infers
that the high-level color transform control flag is false ("0")
(i.e., determines that the application of the color space
transform is not allowed for the blocks in the sequence).

The color space transform may not be allowed to be
applied to a coding block jointly with a Cross-Component
Linear Model (CCLM). Accordingly, when the block-level
color transform control flag indicates that the color space
transform is applied to the current block, the video decoder
determines that the CCLM is not applied to the chroma
components of the current block.

In some cases, the color space transform may be used
jointly with inter chroma component prediction. Accord-
ingly, in order to generate the prediction blocks of the color
components for the current block, at least one of the color
components of the current block may also be predicted from
another color component.

It should be understood that the above-described embodi-
ments can be implemented in many different ways. The
functions described in one or more examples may be imple-
mented in hardware, software, firmware, or any combination
of the above. The functional components described in this
specification have been labeled as units in order to more
particularly emphasize their potential independent imple-
mentation.

Meanwhile, various methods or functions described in the
present disclosure may be implemented with instructions
stored in a non-transitory recording medium, which may be
read and executed by one or more processors. The non-
transitory recording medium includes, for example, all types
of recording devices in which data is stored in a form
readable by a computer system. For example, the non-
transitory recording medium includes storage media such as
an erasable and programmable read only memory
(EPROM), an electrically erasable and programmable read-only memory (EEPROM), a flash drive, an optical drive, a
magnetic hard drive, and a solid state drive (SSD).

Although embodiments have been described for illustra-
tive purposes, those having ordinary skill in the art should
appreciate that and various modifications and changes are
possible, without departing from the idea and scope of the
embodiments. Embodiments have been described for the
sake of brevity and clarity. Accordingly, one of ordinary skill
should understand that the scope of the embodiments is not
limited by the embodiments explicitly described above but
is inclusive of the claims and equivalents thereto.

What is claimed is:

1. A method for decoding video data, the method com-
prising:
    obtaining motion information and first residual data for a
        current block from a bitstream;
    determining whether to apply color space transform to the
        first residual data based on a high-level color transform
        control flag and a block-level color transform control
        flag;
    in response to a determination that the color space trans-
        form is applied to the first residual data, generating
        second residual data by performing reverse color trans-
        form on the first residual data;
    generating a prediction block for the current block by
        inter-predicting the current block using the motion
        information;
    generating a reconstructed block for the current block
        based on the prediction block and the second residual
        data,
    wherein the high-level color transform control flag is
        signaled in the bitstream depending on a maximum
        transform size allowed in a sequence of pictures includ-
        ing the current block, and the block-level color trans-
        form control flag is signaled in the bitstream depending
        on the high-level color transform control flag, and
    wherein, when the high-level color transform control flag
        and the block-level color transform control flag are not
        signaled, the high-level color transform control flag and
        the block-level color transform control flag are inferred
        to be false;
    decoding a syntax element indicating the maximum trans-
        form size allowed for the sequence of the pictures from
        the bitstream; and
    decoding the high-level color transform control flag from
        the bitstream when the syntax element indicates that the
        maximum transform size is smaller than a predeter-
        mined value.

2. The method of claim 1, further comprising:
    when the high-level color transform control flag indicates
        that the application of the color space transform is
        allowed for blocks within the sequence, decoding the
        block-level color transform control flag for the current
        block from the bitstream.

3. The method of claim 1, further comprising:
    when a luma component and chroma components of the
        current block are encoded based on a dual partitioning
        tree, determining that the color space transform is not
        applied to the current block without decoding the
        block-level color transform control flag.

4. The method of claim 1, further comprising:
    when a chroma sampling format for the video data is a
        chroma sampling format other than 4:4:4, determining
        that the application of the color space transform is not
        allowed for the blocks in the sequence without decod-
        ing the high-level color transform control flag.

5. The method of claim 1, wherein generating the prediction block for the current block further includes: when the block-level color transform control flag indicates that the color space transform is applied to the current block, determining that a cross-component linear model (CCLM) is not applied to chroma components of the current block.

6. The method of claim 1, wherein generating the prediction block for the current block further includes predicting at least one of color components of the current block from other color component.

7. The method of claim 1, wherein the first residual data includes residual data for each of color components of the current block.

8. A method for encoding video data, the method comprising:

encoding a syntax element indicating a maximum transform size allowed for a sequence of pictures of the video data into a bitstream;

when the syntax element indicates that the maximum transform size is smaller than a predetermined value, encoding a first control flag indicating whether application of color space transform is allowed for blocks within the sequence into the bitstream;

when the first control flag indicates that the application of the color space transform is allowed for the blocks within the sequence, encoding a second control flag indicating whether the color space transform is applied to a current block in the sequence into the bitstream;

determining motion information of the current block and generating a prediction block for the current block using the motion information;

generating first residual data for the current block based on the prediction block;

when the second control flag indicates that the color space transform is applied to the current block, performing color transform on the first residual data to generate second residual data and encoding the second residual data for the current block into the bitstream; and when the second control flag indicates that the color space transform is not applied to the current block, encoding the first residual data for the current block into the bitstream.

9. A method for providing a video decoding device with video data, the method comprising:

encoding the video data into a bitstream; and transmitting the bitstream to the video decoding device, wherein encoding the video data includes:

encoding a syntax element indicating a maximum transform size allowed for a sequence of pictures of the video data into the bitstream;

when the syntax element indicates that the maximum transform size is smaller than a predetermined value, encoding a first control flag indicating whether application of color space transform is allowed for blocks within the sequence into the bitstream;

when the first control flag indicates that the application of the color space transform is allowed for the blocks within the sequence, encoding a second control flag indicating whether the color space transform is applied to a current block in the sequence into the bitstream;

determining motion information of the current block and generating a prediction block for the current block using the motion information;

generating first residual data for the current block based on the prediction block;

when the second control flag indicates that the color space transform is applied to the current block, performing color transform on the first residual data to generate second residual data and encoding the second residual data for the current block into the bitstream; and when the second control flag indicates that the color space transform is not applied to the current block, encoding the first residual data for the current block into the bitstream.

\* \* \* \* \*